COINCIDENT CURRENT MAGNETIC PLATE MEMORY

Filed Aug. 22, 1963 3 Sheets-Sheet 1

INVENTOR.
JAN A. RAJCHMAN
BY
Carl V. Olson
Attorney

April 4, 1967 J. A. RAJCHMAN 3,312,961

COINCIDENT CURRENT MAGNETIC PLATE MEMORY

Filed Aug. 22, 1963 3 Sheets-Sheet 2

INVENTOR.
JAN A. RAJCHMAN
BY Carl V. Olson
Attorney

April 4, 1967 J. A. RAJCHMAN 3,312,961
COINCIDENT CURRENT MAGNETIC PLATE MEMORY
Filed Aug. 22, 1963 3 Sheets-Sheet 3

INVENTOR.
JAN A. RAJCHMAN
BY
Carl V. Olson
Attorney 3,312,961

COINCIDENT CURRENT MAGNETIC PLATE MEMORY

Jan A. Rajchman, Princeton, N.J., assignor to Radio Corporation of America, a corporation of Delaware Filed Aug. 22, 1963, Ser. No. 303,766
8 Claims. (Cl. 340—174)

This invention relates to memories, and particularly to coincident-current random-access memories capable of construction in very small dimensions by automated techniques.

In coincident-current memories, access to one of many storage locations is accomplished by applying a half-select pulse to one of a plurality of $x$ conductors concurrently with the application of a half-select pulse to one of a plurality of $y$ conductors. A coincident-current memory has the advantage, compared with a word organized memory, that the selective addressing or word locations is accomplished with much simpler and less expensive electronic circuitry.

It is the general object of this invention to provide an improved coincident-current random-access memory wherein a plurality of sets of conductors are disposed in separate parallel planes and are embedded in a sheet of magnetic material to provide a construction well adapted to mass production by automated techniques.

According to an example of the invention, there are provided a plurality of $x$ selection conductors embedded in a first plane in a magnetic sheet, and a plurality of $y$ selection conductors embedded in a second parallel plane in the sheet. Each of the $x$ selection conductors have portions extending parallel with portions of each of the $y$ selection conductors to define a number of word storage locations equal to the product of the numbers of $x$ and $y$ conductors. Digit conductors are embedded in a third parallel plane in the magnetic sheet. Each digit conductor extends across all of the word storage locations to define corresponding bit storage locations in all of the word storage locations. The magnetic sheet with embedded conductors is preferably constructed by forming each set of $x$, $y$ and digit conductors on a separate layer of "green" (i.e., unfired) doctor bladed ferrite, assembling the layers with others into a sandwich, and firing the sandwich to produce a uniform homogeneous sintered sheet having conductors embedded therein.

Figure 1:
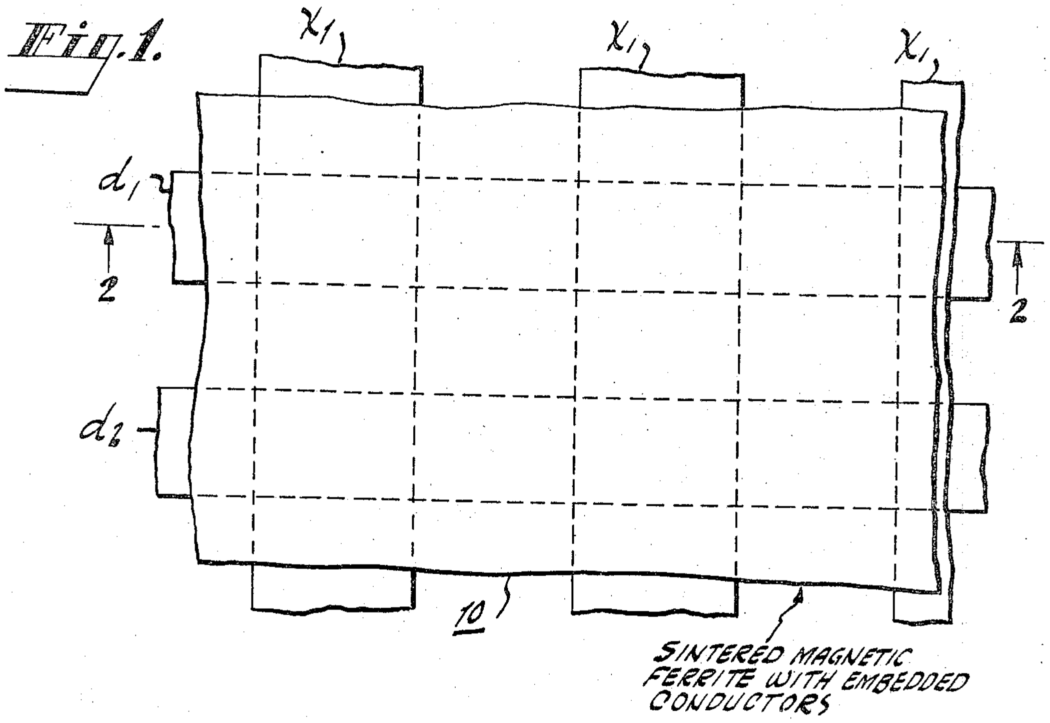
FIG. 1 is a plan view of a fragment of a memory constructed according to the teachings of the invention.
Figure 2:
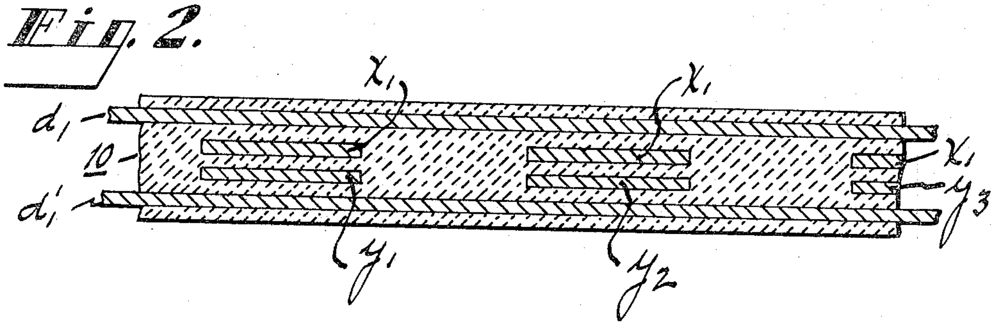
FIG. 2 is a sectional view taken on the line 2—2 of FIG. 1.
Figure 3:
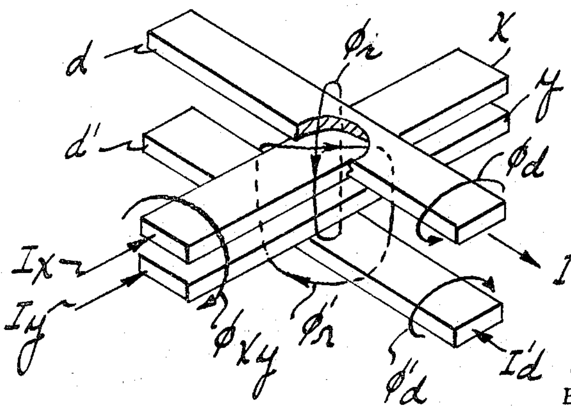
FIG. 3 is an isometric view of conductors at one bit storage location, which will be referred to in explaining the operation of the memory.

Referring now in greater detail to FIGS. 1 and 2, there is shown a uniform homogeneous sheet 10 of sintered magnetic ferrite having embedded conductors. Conductors designated $x$ are embedded in a first plane, conductors designated $y$ are embedded in a second adjacent parallel plane and conductors designated $d$ and $d'$ are embedded in third and fourth planes on both sides of the planes of the $x$ and $y$ conductors. One bit storage location is constituted by the surrounding magnetic material where the parallel-extending conductors $x_1$ and $y_1$ are crossed by the parallel digit conductors $d_1$ and $d_1'$. Similarly, additional bit storage locations are constituted at other crossovers, such as the crossover of $x_1$ and $y_2$ by $d_1$ and $d_1'$, etc. The relationship of the embedded conductors at each bit storage location is as represented in FIG. 3.

Figure 4:
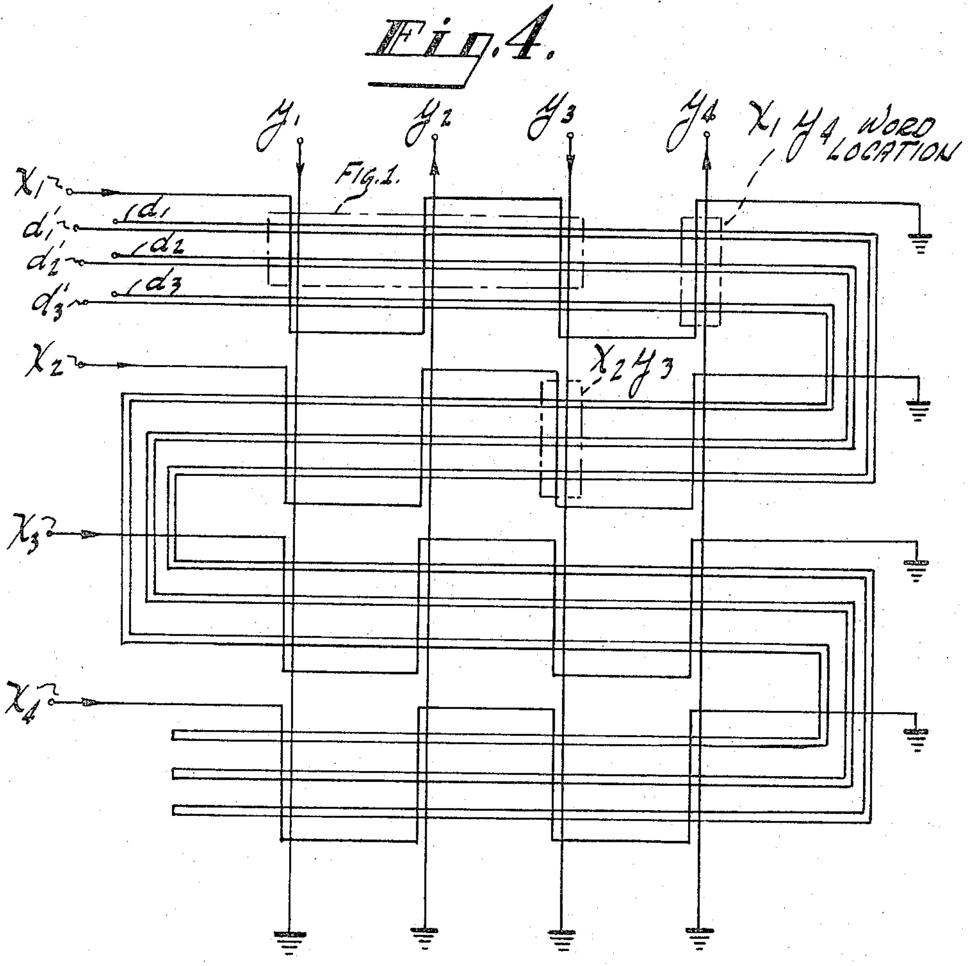
FIG. 4 is a plan view of conductors in a memory having sixteen word storage locations each having three bit storage locations.

FIG. 4 shows the conductors only of a memory including the fragmentary part illustrated in FIG. 1: the memory example shown includes four $x$ selection conductors $x_1$, $x_2$, $x_3$ and $x_4$ in a first plane; and four $y$ selection conductors $y_1$, $y_2$, $y_3$ and $y_4$ in a second parallel plane. Each $x$ conductor includes a number of separate portions equal to the number of $y$ conductors. The portions of each $x$ conductor extend parallel with respective, co-extensive portions of the $y$ conductors. Each of the sixteen co-extensive parallel portions of $x$ and $y$ conductors define a word storage location. For example, the parallel-extending portions designated $x_1y_4$ define one word location, and the portions designated $x_2y_3$ define another word storage location.

The memory includes three digit or digit-sense conductors $d_1$, $d_2$ and $d_3$ lying in a third plane and returning as conductors $d_1'$, $d_2'$, and $d_3'$ in a fourth plane. Each digit conductor pair $d$,$d'$ extends across all sixteen of the word storage locations to define corresponding bit storage locations in all of the word storage locations. In the example illustrated, each of the sixteen word storage locations include three bit storage locations. The arrangement shown is illustrative of arrangements which may have a much larger number of word storage locations, each having a much larger number of bit storage locations.

Figure 5:
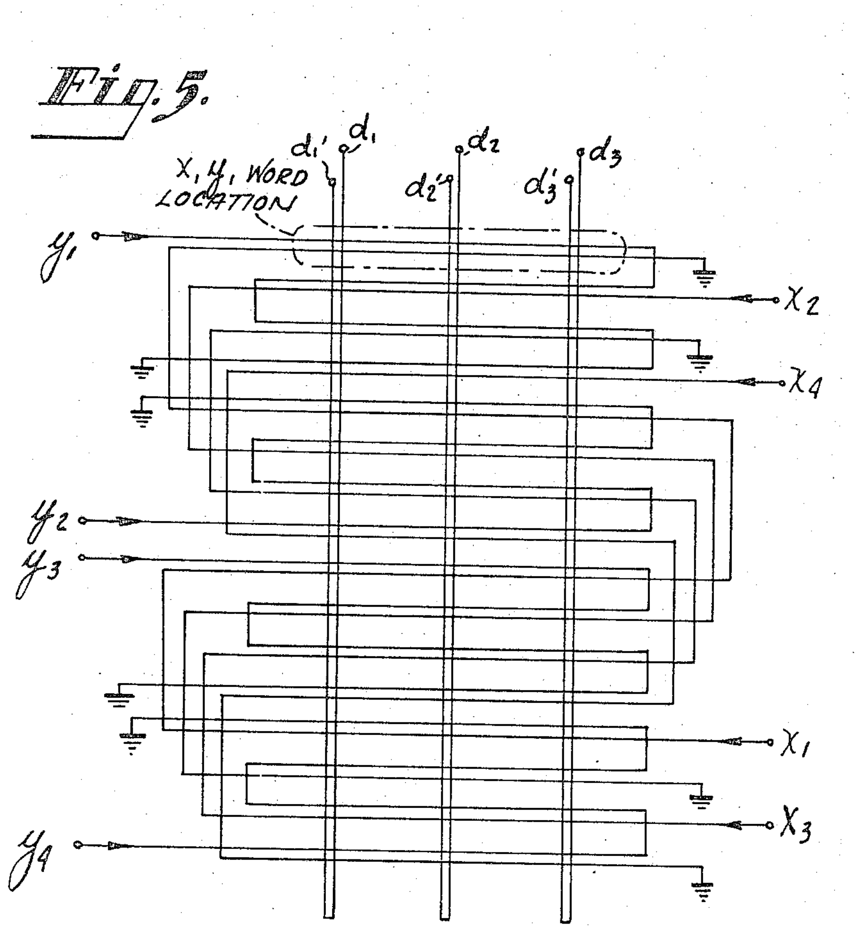
FIG. 5 is a plan view of an alternative arrangement of conductors also providing sixteen word storage locations of three bits each.

FIG. 5 illustrates an alternative arrangement of the same number of conductors for providing the same number of storage locations as the arrangement of FIG. 4. In FIG. 5, the parallel portions of the $x_1y_1$ conductors define the correspondingly designated word location at the top of the diagram. The following word locations are $x_2y_1$, $x_3y_1$, $x_4y_1$, $x_1y_2$, $x_2y_2$, etc. The arrangement of conductors shown in FIG. 5 is preferred over the arrangement shown in FIG. 4 for manufacturing reasons. The same stencil or master pattern may be used for creating the parallel portions of both the $x$ and the $y$ conductors in the arrangement of FIG. 5. This simplifies the problems related to registration of the $x$ and $y$ conductor patterns during manufacturing assembly.

The memory consisting of a sheet of magnetic material 10 having embedded $x$, $y$ and $d$ conductors is preferably accomplished by doctor bladed ferrite memory technology. The structure illustrated in the cross-sectional view of FIG. 2 is assembled from several layers of green ferrite, four of which have deposited conductive patterns corresponding with the desired patterns of the $x$, $y$, $d$ and $d'$ conductors. Each green ferrite layer is formed by pouring a slurry of ferrite powder on a glass substrate, drawing a doctor blade across the slurry at a fixed distance above the glass substrate, and allowing the slurry to dry to form a thin leather-like layer of green ferrite. The green ferrite layers are provided with conductive patterns using refractory metals, or metal powders, that can withstand the high firing temperatures subsequently employed to sinter the green ferrite. The green ferrite layers with printed conductive patterns, and additional green ferrite layers, are assembled together in a sandwich and are subjected to pressure and a firing temperature of about 1200° C. to create a homogeneous uniform sintered ferrite sheet having the desired square loop magnetic characteristics and having the desired embedded conductor patterns.

The described doctor bladed memory construction method can be used to make a memory wherein the conductors and individual information storage locations have very small physical dimensions. For example, each of the conductors may have a thickness of 0.0005 inch, a width of 0.003 inch and a spacing in the same plane of 0.003 inch. The ferrite layers may have a thickness to provide a separation of 0.0005 to 0.001 inch between conductors in the parallel planes. The top and bottom ferrite layers should have a thickness of at least 0.002 inch to provide mechanical strength. The ferrite material is itself an electrically insulating material so that no additional insulation is needed between the conductors. The small dimensions of the conductors and the resulting short flux paths around the conductors facilitates rapid switching of flux at storage locations and thus provides for faster operation than can be achieved with electro-magnetic elements of larger physical size.

The operation of an individual bit storage location will be described with references to FIGS. 3 and 4. A selected one of the sixteen illustrated word storage locations is addressed by directing half-select current pulses through one of the $x$ conductors and one of the $y$ conductors. For example, currents supplied to the $x_1$ and $y_4$ conductors results in a switching of flux in solely the $x_1y_4$ word storage location. The other six word storage locations ($x_1y_1$, $x_1y_2$, $x_1y_3$, $x_2y_4$, $x_3y_4$ and $x_4y_4$) wherein solely the $x$ or the $y$ conductor is energized, do not receive sufficient energization to switch a significant amount of flux.

FIG. 3 illustrates one bit storage location of a selected word storage location where currents $I_x$ and $I_y$ are applied in the direction indicated for the purpose of writing information into the word location. The combined effect of two half-select currents $I_x$ and $I_y$ tends to cause a closed loop flux around the $x$ and $y$ conductors as represented $\phi_{xy}$. Concurrently, to write a "1" information bit, digit current pulses $I_d$ and $I_d'$ are applied to the digit conductors $d$ and $d'$ in the direction indicated to tend to cause respective closed loop fluxes $\phi_d$ and $\phi_d'$. The orthogonal currents and fluxes at the crossovers of the conductors interact to produce a resultant diagonal flux $\phi_r$ in the direction indicated around the conductors $d$, $x$ and $y$. There is also produced a resultant flux $\phi_r'$ in the direction indicated around the conductors $x$, $y$ and $d'$. The fluxes $\phi_r$ and $\phi_r'$ remain after the current pulses are removed, to provide storage of the written information bit until its read-out is desired.

To read out the stored "1" information bit, current pulses in the opposite direction are applied to the conductors $x$ and $y$. This forces the resultant closed loop fluxes $\phi_r$ and $\phi_r'$ to switch or rotate from the diagonal positions shown to positions lying in planes at right angles with the conductors $x$ and $y$. In the process of switching or rotating, the resultant flux loops $\phi_r$ and $\phi_r'$ cut the digit (or digit-sense) conductors $d$ and $d'$ and induce signals in both of the digit conductors which have a polarity indicative of the fact that a "1" information bit was stored in the bit storage location.

When it is desired to write a "0" into the bit location, digit current pulses of polarity opposite that shown in FIG. 3 are employed to produce resultant fluxes lying in planes each rotated 90 degrees from the planes containing the "1"—indicating fluxes $\phi_r$ and $\phi_r'$. Then, when the information is read out, the sense signals on the digit conductors $d$ and $d'$ have the opposite polarity indicative of the storage of a "0" information bit.

The arrangement described employs two digit conductors $d$ and $d'$ at each bit storage location for the storage and retrieval of one information bit. The arrangement is one wherein the conductor $d'$ is the return path for the conductor $d$, the two conductors constituting a digit or digit-sense conductor pair for carrying the same digit pulse in opposite directions, and for carrying additive versions of the same sense signal.

Figure 6:
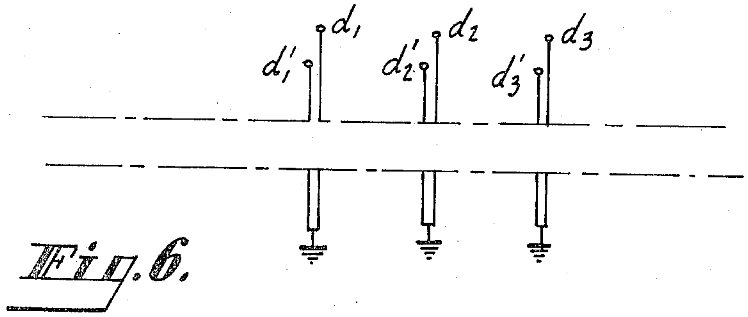
FIG. 6 is a plan view illustrating a modification of the digit conductors in the arrangement of FIG. 5.

FIG. 6 illustrates an alternative arrangement which is the same as the arrangement of FIG. 5 except that each digit conductor $d$ is electrically independent of each corresponding conductor $d'$ by reason of their having ground return paths from their lower ends. In this arrangement, two independent information bits may be stored at each location such as the one illustrated by FIG. 3. The resultant flux $\phi_r$ is then representative of an information bit associated with the digit conductor $d$, and the flux $\phi_r'$ is representative of another information bit associated with digit conductor $d'$. In this case, the sense signal derived from each of the two bit storage locations is half the sense signal derived in the arrangement previously described.

What is claimed is:

1. The combination of a magnetic sheet,
$x$ selection conductors embedded in a first plane in said sheet and $y$ selection conductors embedded in a second parallel plane in said sheet,
each of said $x$ selection conductors having portions extending parallel with portions of each of said $y$ selection conductors to define word storage locations, and
digit conductors embedded in a third parallel plane in said ferrite sheet and each extending across all of said word storage locations.

2. A coincident-current memory comprising a magnetic sheet,
a plurality of $x$ selection conductors embedded in a first plane in said sheet and a plurality of $y$ selection conductors embedded in a second parallel plane in said sheet,
each of said $x$ selection conductors having portions extending parallel with portions of each of said $y$ selection conductors to define a number of word storage locations equal to the product of the numbers of $x$ and $y$ conductors, and
a plurality of digit conductors embedded in a third parallel plane in said ferrite sheet, said digit-sense conductors extending across all of said word storage locations to define a number of bit storage locations in each word storage location equal to the number of digit conductors.

3. A coincident-current memory comprising a magnetic ferrite sheet,
$x$ selection conductors embedded in a first plane in said ferrite sheet and $y$ selection conductors embedded in a second parallel plane in said ferrite sheet,
each of said $x$ selection conductors having portions extending parallel with portions of each of said $y$ selection conductors to define word storage locations, and
digit-sense conductors embedded in a third parallel plane in said ferrite sheet, said digit-sense conductors extending in parallel side-by-side relation across all of said word storage locations to define bit storage locations in each word storage location.

4. A coincident-current memory comprising a homogeneous sintered magnetic ferrite sheet,
$x$ selection conductors embedded in a first plane in said ferrite sheet and $y$ selection conductors embedded in a second parallel plane in said ferrite sheet,
each of said $x$ selection conductors having portions extending parallel with portions of each of said $y$ selection conductors to define a number of word storage locations equal to the product of the numbers of $x$ and $y$ conductors, and
a number of digit-sense conductors embedded in a third parallel plane in said ferrite sheet, said digit-sense conductors extending in parallel side-by-side relation at right angles across all of said word storage locations to define a corresponding number of bit storage locations in each word storage location.

5. A coincident-current memory comprising a magnetic sheet,
a number of $x$ selection conductors embedded in a first plane in said magnetic sheet and a number of $y$ selection conductors embedded in a second parallel plane in said magnetic sheet, each of said $x$ selection conductors having portions extending parallel with portions of each of said $y$ selection conductors to define a number of word storage locations equal to the product of the numbers of said $x$ and $y$ conductors, and a number of digit-sense conductor pairs each including a conductor in said magnetic sheet in each of third and fourth planes on both sides of said first and second planes, said digit-sense conductor pairs each crossing each of said word storage locations to define a corresponding number of bit storage locations in each word storage location.

6. A coincident-current memory comprising a homogeneous sintered magnetic ferrite sheet, $x$ selection conductors embedded in a first plane in said ferrite sheet and $y$ selection conductors embedded in a second parallel plane in said ferrite sheet, each of said $x$ selection conductors having portions extending parallel with portions of each of said $y$ selection conductors to define word storage locations, and a number of digit-sense conductor pairs each including a conductor in said ferrite sheet in each of third and fourth planes on both sides of said first and second planes, said digit-sense conductor pairs each crossing each of said word storage locations to define a corresponding number of bit storage locations in each word storage location.

7. A coincident-current memory comprising a homogeneous sintered magnetic ferrite sheet, $x$ selection conductors embedded in a first plane in said ferrite sheet and $y$ selection conductors embedded in a second parallel plane in said ferrite sheet, each of said $x$ selection conductors having portions extending parallel with portions of each of said $y$ selection conductors to define word storage locations, and digit conductors in said ferrite sheet in a third plane on one side of said first and second planes, and digit conductors in a fourth plane on the other side of said first and second planes, said digit conductors each crossing each of said word storage locations to define a corresponding number of bit storage locations in each word storage location.

8. A memory element comprising a magnetic member, first and second parallel-extending conductors embedded in said member, and third and fourth parallel-extending conductors embedded in said member in crossed relation to said first and second conductors, said third and fourth conductors being located on opposite sides of said first and second conductors.

References Cited by the Examiner

UNITED STATES PATENTS

| | | | |
|---|---|---|---|
| 2,736,880 | 2/1956 | Forrester | 340—174 |
| 2,942,239 | 6/1960 | Eckert et al. | 340—174 |
| 3,040,301 | 6/1962 | Howatt et al. | 340—174 |
| 3,155,943 | 11/1964 | Markowitz | 340—174 |
| 3,278,910 | 10/1966 | Bobeck | 340—174 |

References Cited by the Applicant

FOREIGN PATENTS 986,024 3/1965 Great Britain.

BERNARD KONICK, *Primary Examiner.*

S. M. URYNOWICZ, *Assistant Examiner.*